US009292245B2

(12) United States Patent
Otey et al.

(10) Patent No.: US 9,292,245 B2
(45) Date of Patent: *Mar. 22, 2016

(54) PREDICTIVE SCHEDULE-BASED TRACKING OF INCOMING PRINT JOBS

(71) Applicant: Ricoh Company, Ltd., Tokyo (JP)

(72) Inventors: Ned Otey, Louisville, CO (US); Brent Winters, Longmont, CO (US); Joseph G. Frick, Adrian, MI (US); David Stokes, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,965

(22) Filed: Apr. 8, 2015

(65) Prior Publication Data

US 2015/0212775 A1    Jul. 30, 2015

Related U.S. Application Data

(63) Continuation of application No. 13/726,902, filed on Dec. 26, 2012, now Pat. No. 9,036,187.

(51) Int. Cl.
*G06F 3/12* (2006.01)
*G06K 15/02* (2006.01)

(52) U.S. Cl.
CPC .............. *G06F 3/1259* (2013.01); *G06F 3/126* (2013.01); *G06F 3/1207* (2013.01); *G06F 3/1212* (2013.01); *G06F 3/1282* (2013.01); *G06F 3/1285* (2013.01); *G06K 15/02* (2013.01)

(58) Field of Classification Search
None
See application file for complete search history.

(56) References Cited

U.S. PATENT DOCUMENTS

| 2007/0124421 | A1* | 5/2007 | Tashiro | H04N 1/00 709/217 |
| 2007/0223050 | A1* | 9/2007 | Someya | G06F 17/30011 358/404 |
| 2009/0073500 | A1* | 3/2009 | Brown | G06F 3/1294 358/402 |
| 2009/0207449 | A1* | 8/2009 | Johnson | G03G 15/5079 358/1.15 |
| 2010/0195138 | A1* | 8/2010 | DeRoller | G06F 3/1203 358/1.15 |
| 2011/0194143 | A1* | 8/2011 | Yamaguchi | G03G 15/5079 358/1.15 |
| 2011/0211218 | A1* | 9/2011 | Gilmore | G06F 3/1207 358/1.15 |
| 2012/0092699 | A1* | 4/2012 | Moore | H04L 63/1416 358/1.15 |
| 2012/0105904 | A1* | 5/2012 | Otey | G06F 3/1207 358/1.15 |
| 2012/0154846 | A1* | 6/2012 | Hoarau | G06F 11/3072 358/1.14 |
| 2012/0194849 | A1* | 8/2012 | Lahey | G06F 3/1203 358/1.15 |
| 2013/0063764 | A1* | 3/2013 | Gross | G06Q 10/06 358/1.15 |

* cited by examiner

*Primary Examiner* — Benny Q Tieu
*Assistant Examiner* — Sunil Chacko
(74) *Attorney, Agent, or Firm* — Duft Bornsen & Fettig LLP

(57) ABSTRACT

Systems and methods are provided for predictively tracking expected print jobs. The system comprises a memory that identifies categories of print jobs, and that stores rules that indicate how often print jobs will be received at a presentation system. The system also comprises a control unit operable to identify a rule for a category of print jobs, to analyze the rule to generate a predicted schedule of print jobs expected for receipt at the presentation system, and to determine whether expected print jobs have been received at the presentation system in accordance with the schedule. The control unit is further operable to generate an alert if an expected print job has not been received at the presentation system in accordance with the schedule.

20 Claims, 7 Drawing Sheets

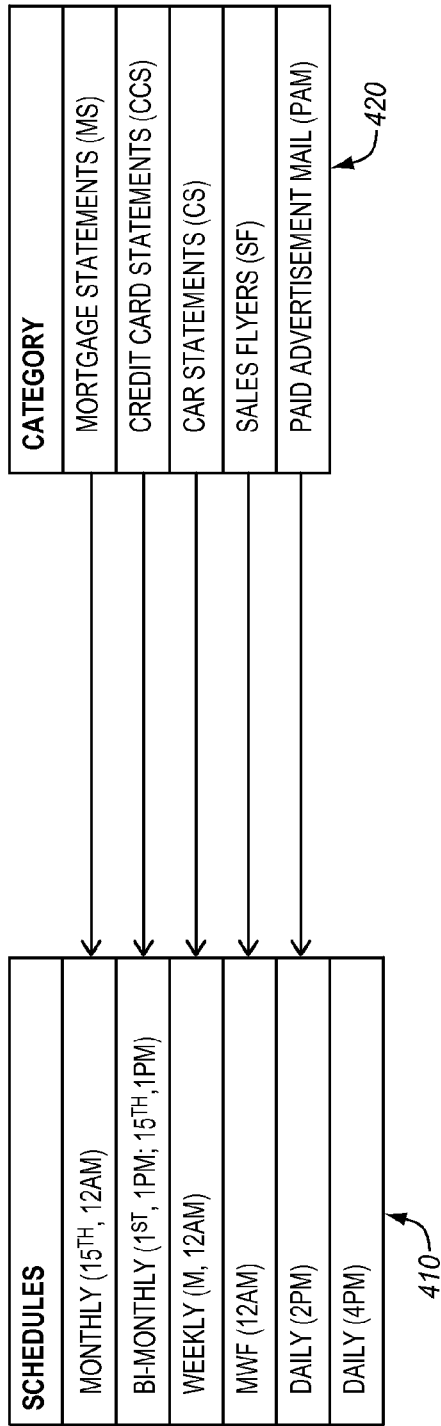

*FIG. 6*

| TIME SLOT | JOB CATEGORY | EXPECTED RECEIPT TIME | STATUS |
|---|---|---|---|
| DEC | MS | MONDAY (15TH, 12AM) | RECEIVED |
| M | SF | MONDAY (15TH, 12AM) | RECEIVED (LATE, 6 HOURS) |
| W2 | CCS | MONDAY (15TH, 12AM) | LATE |
| DEC 2/2 | CS | MONDAY (15TH, 1PM) | RECEIVED |
| M | PAM | MONDAY (15TH, 2PM) | RECEIVED |

600 — STATUS OF EXPECTED JOBS

FIG. 7

| TIME SLOT | JOB CATEGORY | EXPECTED RECEIPT TIME | STATUS |
|---|---|---|---|
| T | PAM | TUESDAY (25TH, 12AM) | EXCEPTION - HOLIDAY |

700

STATUS OF EXPECTED JOBS

December 12

| S | M | T | W | T | F | S |
|---|---|---|---|---|---|---|
|   |   |   |   |   |   | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | (25) | 26 | 27 | 28 | 29 |
| 31 | 31 |   |   |   |   |   |

PREDICTIVE SCHEDULE-BASED TRACKING OF INCOMING PRINT JOBS

RELATED APPLICATIONS

This document is a continuation of co-pending U.S. patent application Ser. No. 13/726,902 (filed on Dec. 26, 2012) titled, "PREDICTIVE SCHEDULE-BASED TRACKING OF INCOMING PRINT JOBS," which is hereby incorporated by reference.

FIELD OF THE INVENTION

The invention relates to the field of presentation systems, and in particular, to presentation systems that determine whether expected print jobs have been received on time.

BACKGROUND

A presentation system is a system that is capable of processing a print job (e.g., any incoming job with content that can be rasterized for display and/or printing) for viewing. When processing an incoming print job, a presentation system rasterizes print data from the job, and provides the rasterized print data for viewing via an output device. For example, a presentation system may generate physically printed jobs via a printer, or may output digitally rendered jobs to customers via an e-mail server. Presentation systems can vary in size from a small desktop printer to a massive print shop that includes multiple print servers and continuous-forms printing machines.

Presentation systems, especially those that process a high-volume of print jobs, are often required to perform in specific ways in order to meet customer demands. Service Level Agreements (SLAs) are sets of requirements that indicate how a presentation system should process incoming jobs for a customer. For example, an SLA may indicate that certain incoming print jobs should be processed within a certain period of time.

SLA tracking is a method of determining the level of compliance of a presentation system with an SLA. Existing SLA tracking systems can be used to determine, for example, whether print jobs that are expected to be received at the presentation system from a customer have actually been received at the presentation system.

In existing SLA tracking systems, a customer must explicitly list each and every job that a presentation system should receive, as well as the time at which each job should be received. The SLA tracking system then uses this list to determine which jobs were received on time, which jobs were late, and which jobs were not received at all.

However, in large print shops that process thousands of jobs per day, it can remain a daunting task to set up SLA tracking systems because new lists of expected jobs may have to be generated by customers every day, which takes a substantial amount of time and effort. Therefore, enhanced SLA tracking systems are desirable.

SUMMARY

Embodiments described herein illustrate presentation systems that predictively generate schedules that estimate when print jobs should be received from a customer. Each schedule lists expected print jobs that should have been received from a customer over time. If any of the expected print jobs have not yet been received, the presentation system can generate an alert, allowing an operator to address the issue. The schedules are generated at the presentation system without any need for a specific customer list. This substantially increases the ease of implementing SLA tracking features in the presentation system.

One embodiment is a system that predictively tracks expected print jobs. The system comprises a memory that identifies categories of print jobs, and that stores rules that indicate how often print jobs will be received at a presentation system. The system also comprises a control unit operable to identify a rule for a category of print jobs, to analyze the rule to generate a predicted schedule of print jobs expected for receipt at the presentation system, and to determine whether expected print jobs have been received at the presentation system in accordance with the schedule. The control unit is further operable to generate an alert if an expected print job has not been received at the presentation system in accordance with the schedule.

Another embodiment is a method. The method comprises accessing a memory of a presentation system, wherein the memory identifies categories of print jobs and stores rules that indicate how often print jobs will be received at the presentation system. The method further comprises identifying a rule for a category of print jobs, analyzing the rule with a processor of the presentation system to generate a predicted schedule of print jobs expected for receipt at the presentation system, and determining with the processor whether expected print jobs have been received at the presentation system in accordance with the schedule. The method further comprises generating an alert if an expected print job has not been received at the presentation system.

Another embodiment is a non-transitory computer readable medium embodying programmed instructions which, when executed by a processor, are operable for performing a method. The method comprises accessing a memory of a presentation system, wherein the memory identifies categories of print jobs and stores rules that indicate how often print jobs will be received at the presentation system. The method further comprises identifying a rule for a category of print jobs, analyzing the rule with a processor of the presentation system to generate a predicted schedule of print jobs expected for receipt at the presentation system, and determining with the processor whether expected print jobs have been received at the presentation system in accordance with the schedule. The method further comprises generating an alert if an expected print job has not been received at the presentation system.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 4 is a block diagram illustrating associations between rules and categories of print jobs in an exemplary embodiment.

FIG. 5 is a block diagram illustrating a predicted schedule of expected print jobs in an exemplary embodiment.

FIG. 6 is a block diagram illustrating the status of a set of print jobs in an exemplary embodiment.

FIG. 7 is a block diagram illustrating an exception applied to an expected print job in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
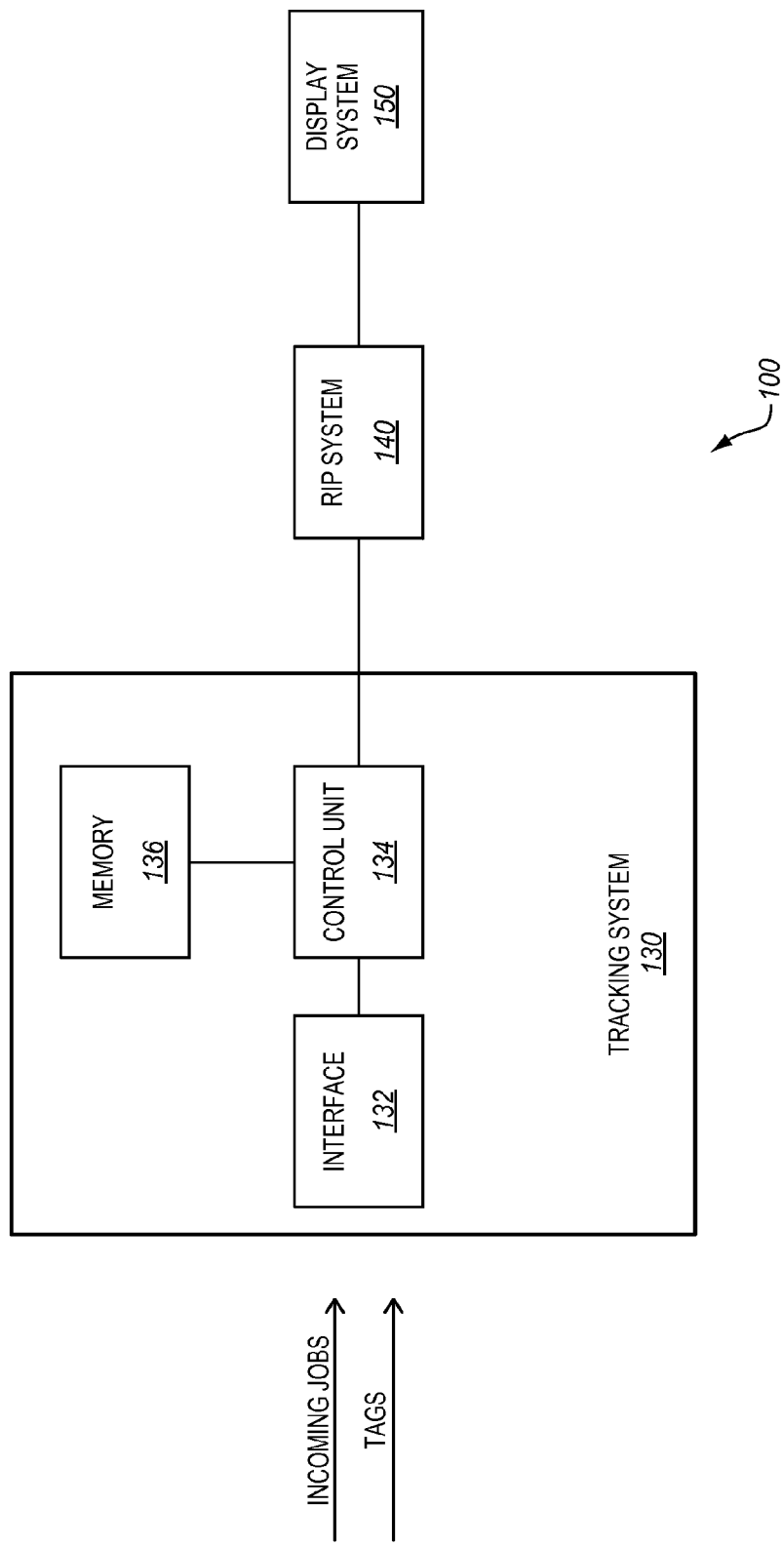
FIG. 1 is a block diagram of a presentation system in an exemplary embodiment.

FIG. 1 is a block diagram of a presentation system 100 in an exemplary embodiment. Presentation system 100 receives incoming print jobs (i.e., jobs that include rasterizable print data) from clients at tracking system 130. Tracking system 130 sends the received print jobs to Rasterization Image Processor (RIP) system 140 for processing, and the rasterized content is sent onward to display system 150 for viewing. In this way, when a customer submits a print job to presentation system 100, presentation system 100 generates a rasterized, viewable version of the print job for the customer. Presentation system 100 often receives jobs of the same type from customers at regular intervals. For example, presentation system may receive monthly mortgage statement print jobs from a customer, may receive advertisements on a weekly basis from a customer, etc.

In order to enhance productivity and to ensure that customer Service Level Agreements (SLAs) are being met, tracking system 130 is capable of utilizing pre-defined rules to generate schedules that predict how many print jobs should be received by presentation system 100 over a given period of time, as well as when each job should be received. Tracking system 130 can then consult a schedule to determine that a print job is late and has not yet been received, even though no specific list of expected print jobs has been provided to tracking system 130 by a customer.

In this embodiment, tracking system 130 includes interface 132, control unit 134, and memory 136. Interface 132 receives incoming print jobs, and control unit 134 updates memory 136 with a list of received print jobs. Control unit 134 may be implemented as custom circuitry, as a processor executing instructions, or some combination thereof. Interface 132 may be any suitable device, component, or combination thereof capable of receiving data. In one embodiment, interface 132 comprises a portion of a print server.

Print jobs received by tracking system 130 are provided to RIP system 140. RIP system 140 comprises any system, component, or device operable to rasterize the received print data into a pixel format for presentation. For example, RIP system 140 may include one or more RIPs that operate in sequence or in parallel to generate bitmap images. Tracking system 130 and RIP system 140 may be implemented together within a print server.

Rasterized content from RIP system 140 is provided to display system 150. Display system 150 comprises any system, component, or device operable to present the content from RIP system 140 for viewing. For example, display system 150 may comprise one or more printers, and/or one or more electronic display devices. In one embodiment, an e-mail server transmits e-mail with rasterized content to one or more customers. The screens of the customer devices that receive the e-mails serve as display system 150.

Illustrative details of the operation of presentation system 100 will be discussed with regard to FIG. 2. Assume, for this embodiment, that presentation system 100 regularly receives and processes incoming print jobs from one or more customers over time. Each customer may send the same type or category of print job to presentation system 100 at regular intervals (e.g., daily, monthly, etc.).

Each time a print job is received, control unit 134 reviews a tag included with the print job to determine the category of the print job, as well as to determine an intended time slot for the print job. Control unit 134 then updates memory 136 to indicate that the print job has been received.

Figure 2:
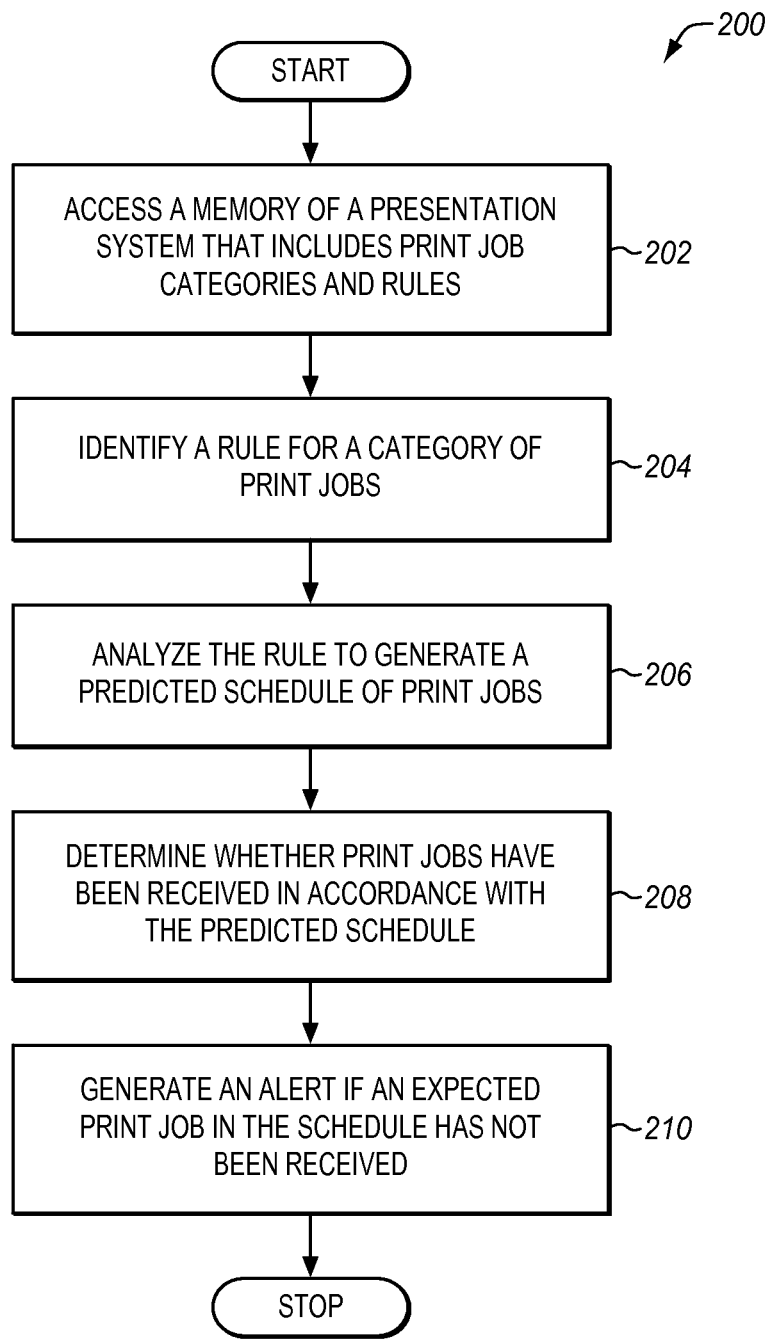
FIG. 2 is a flowchart illustrating a method for operating a presentation system in an exemplary embodiment.

FIG. 2 is a flowchart illustrating a method 200 for operating a presentation system in an exemplary embodiment. The steps of method 200 are described with reference to presentation system 100 of FIG. 1, but those skilled in the art will appreciate that method 200 may be performed in other systems. The steps of the flowcharts described herein are not all inclusive and may include other steps not shown. The steps described herein may also be performed in an alternative order. In method 200, tracking system 130 performs a scheduling check to determine if print jobs are expected to have been received, and to determine if any expected print jobs are late. This scheduling check may be performed in response to a triggering condition and may be performed regularly (e.g., once per hour) or in response to a stimulus (e.g., a user explicitly requesting the check, an error condition, etc.).

In step 202, control unit 134 accesses memory 136. Memory 136 identifies different categories of print jobs. A category of print job is a type of print job created by a customer that meets a customer need. Print jobs from the same category may be syntactically or structurally similar (i.e., may be formatted in the same way), may be generated from the same template, or may be used by the customer for similar purposes. For example, mortgage statements may all be in the same category, mailed advertisements may all be in the same category, etc. Each category of print job is associated with one or more rules stored in memory 136. A rule defines how often print jobs should be received at tracking system 130 via interface 132. For example, a rule may specify the intervals between print jobs as repeating sequences of points in time. In one embodiment, a rule may define that an incoming print job should be received hourly, daily, three times a week (e.g., MWF), once per weekday, once per week, twice per month, monthly, etc.

In step 204, control unit 134 identifies the rules in memory 136 for a category of print jobs. This may comprise selecting a category of print jobs, and then following one or more pointers that lead to the rules in memory. Once the rules for the category have been selected, a schedule of expected jobs for the category can be predictively generated.

In step 206, control unit 134 analyzes the rules for the category of print jobs to generate a predicted schedule of print jobs for the category. The schedule may indicate each expected print job, as well as a time slot (e.g., date and time) for each expected print job. In this way, expected jobs of the same category can be distinguished from each other based on their expected time slot.

The schedule may look back a predefined period in time. For example, the schedule may include a list of expected print jobs from the current time until an hour ago, a day ago, a week ago, etc.

In step 208, control unit 134 determines whether expected print jobs in the schedule have been received in accordance with the schedule. Control unit 134 may make this determination by consulting memory 136 to review a list of previously received print jobs. Because each previously received print job includes a tag indicating its intended time slot (e.g., the Friday instance of a daily job, the 12 pm instance of an hourly job, etc.) and category, control unit 134 can quickly determine which expected print jobs have already been received.

If an expected print job has not been received yet, control unit 134 may check the job against a list of late/unreceived print jobs in memory 136. If the print job is already listed as late/unreceived, then control unit 134 may decide to take no further action. However, if the print job is not listed as late/unreceived, control unit 134 may add an entry to memory 136 indicating the category and time slot of the missing print job.

In step 210, if a print job has been identified as late, then control unit 134 generates an alert. For example, the alert may comprise a message sent to a user indicating the name and time slot of the late job, may comprise sending out the list of presently late jobs, etc. The alert may be provided at a server implementing tracking system 130, via e-mail, phone, text message, etc.

Method 200 may be performed repeatedly (e.g., periodically) for a given category of print jobs. Furthermore, method 200 may be performed for all categories of print jobs at once, or may be repeated for different categories of print jobs at different intervals. For example, control unit 134 may check for late daily advertisements once per hour, and may check for late mortgage statements once per week. Control unit 134 may check each category repeatedly on small time scales as well, such as multiple times per minute.

Independent of the steps of method 200, tracking system 130 may continue to receive incoming print jobs. As each print job is received, control unit 134 may update memory 136. For example, if a tag for the print job indicates that its category is "Mortgage Statement" and its time slot is "February," then control unit 134 may update memory 136 to indicate that the print job has been received (e.g., received on-time or late).

Using the methods and systems described herein, a tracking system can predictively generate schedules of expected print jobs, even though the tracking system never receives an explicit list of expected print jobs. This means that customers receive the benefits of SLA tracking without the substantial time investment required by prior systems.

In a further embodiment, control unit 134 generates revised alerts when late print jobs are received. The revised alerts do not include the newly-received print jobs.

In an additional exemplary embodiment, control unit 134 removes late print jobs from alerts when those expected print jobs have been late for more than a defined period of time. For example, if a print job predicted by a schedule has not been received for an entire month, control unit 134 may determine that a customer never intended to send out the expected print job in the first place. Furthermore, control unit 134 may include functionality (e.g., a user interface) that allows a user to select one or more late print jobs in an alert, and to remove those print jobs from the alert. In this manner, a user may pro-actively indicate whether a job expected by presentation system 100 will actually be provided by a customer or not.

EXAMPLES

In the following examples, additional processes, systems, and methods are described in the context of an SLA tracking system that generates schedules to predict the receipt of incoming print jobs. The SLA tracking system generates the schedules based on rules stored in memory, and each category of print jobs to be tracked is associated with one or more rules.

Figure 3:
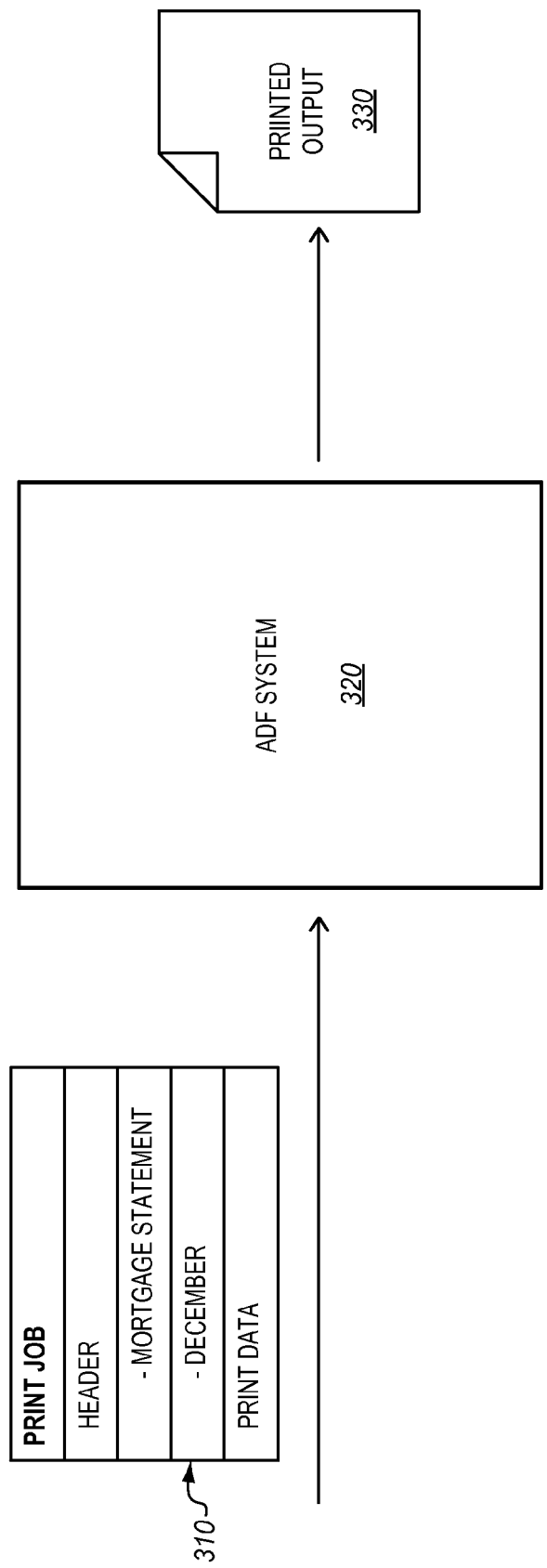
FIG. 3 is a block diagram illustrating an Automated Document Factory (ADF) system implementing an SLA tracking system in an exemplary embodiment.

FIG. 3 is a block diagram illustrating an Automated Document Factory (ADF) system 320 implementing an SLA tracking system in an exemplary embodiment. Each print job received at ADF system 320 includes a header with two tags. The first tag indicates a category for the print job, and the second tag indicates the time slot for the print job. For example, the tags for print job 310 (a monthly mortgage statement) indicate that the job is a "Mortgage Statement" for "December". As each print job is received, ADF system 320 updates an internal memory to indicate that the print job has been received, and then rasterizes the print data for the print job. ADF system 320 then instructs a printer to print the rasterized data and generate printed output 330.

During normal operations, ADF system 320 also performs a scheduling check every fifteen minutes to determine what prints jobs are expected to have been received, as well as to determine whether any expected print jobs are late. The scheduling check includes consulting internal memory to identify rules for each category of print job that ADF system 320 processes.

FIG. 4 is a block diagram illustrating associations between rules 410 and categories of print jobs 420 in an exemplary embodiment. For example, according to FIG. 4, jobs in the mortgage statement category should be received monthly on the $15^{th}$, by 12 am, while paid advertisement jobs should be received daily at 2 pm. ADF system 320 reviews rules 410 for each category 420, and generates a schedule for categories 420. A control unit of ADF system 320 generates the predicted schedule by identifying a look back period in memory (here, twenty four hours). Then, the control unit determines an earlier time corresponding with the look back period (here, yesterday at the same hour and minute of day). The control unit then analyzes each rule 410 starting from the earlier time until the present time, generating an entry in the schedule for each expected job. When the schedule is completed, it includes entries for each print job expected to have been received during the twenty four hours.

FIG. 5 is a block diagram illustrating a predicted schedule 500 of expected print jobs in an exemplary embodiment. According to FIG. 5, schedule 500 lists a category for each anticipated job, a time slot for each anticipated job, and an expected receipt time for each anticipated job. Once schedule 500 has been generated, ADF system 320 reviews each entry in the schedule, and checks each entry against an internal memory to see if the print job has already been received. If the print job is not already listed as late in memory and has not been received, then ADF system 320 updates the memory to indicate that the print job is late and has not been received.

FIG. 6 is a block diagram illustrating the status of a list of print jobs 600 in an exemplary embodiment. Each status in list 600 indicates whether a print job has been received on time, has been received late, or has been flagged as late and not yet received. List 600 is stored in memory, and entries from schedule 500 are checked against list 600 to determine whether they have already been received at ADF system 320, or have already been listed as late. Once schedule 500 has been fully checked against list 600 and list 600 has been updated with late jobs, the ADF system waits for another fifteen minutes, and then performs another scheduling check.

In a later scheduling check, a print job that would normally be flagged as late is not flagged as late by ADF system 320 because of a scheduling exception. FIG. 7 is a block diagram illustrating an exception applied to an expected print job in ADF system 320. According to FIG. 7, at a later point in time, a schedule 700 generated by ADF system 320 indicates that a paid advertisement mailing should be received on Tuesday, the 25$^{th}$ of December, at 12 am. However, ADF system 320 determines that the mailing has not been received on time. Once the mailing is determined to be late, ADF system 320 reviews memory to see if any system-wide exceptions are defined. ADF system 320 then determines that the 25$^{th}$ of December corresponds to the Christmas holiday, and does not flag the print job as late, but rather flags the print job with an exception. This means that an alert will not be generated for the print shop operator during the holiday, because the print job will not yet be listed as late.

Figure 8:
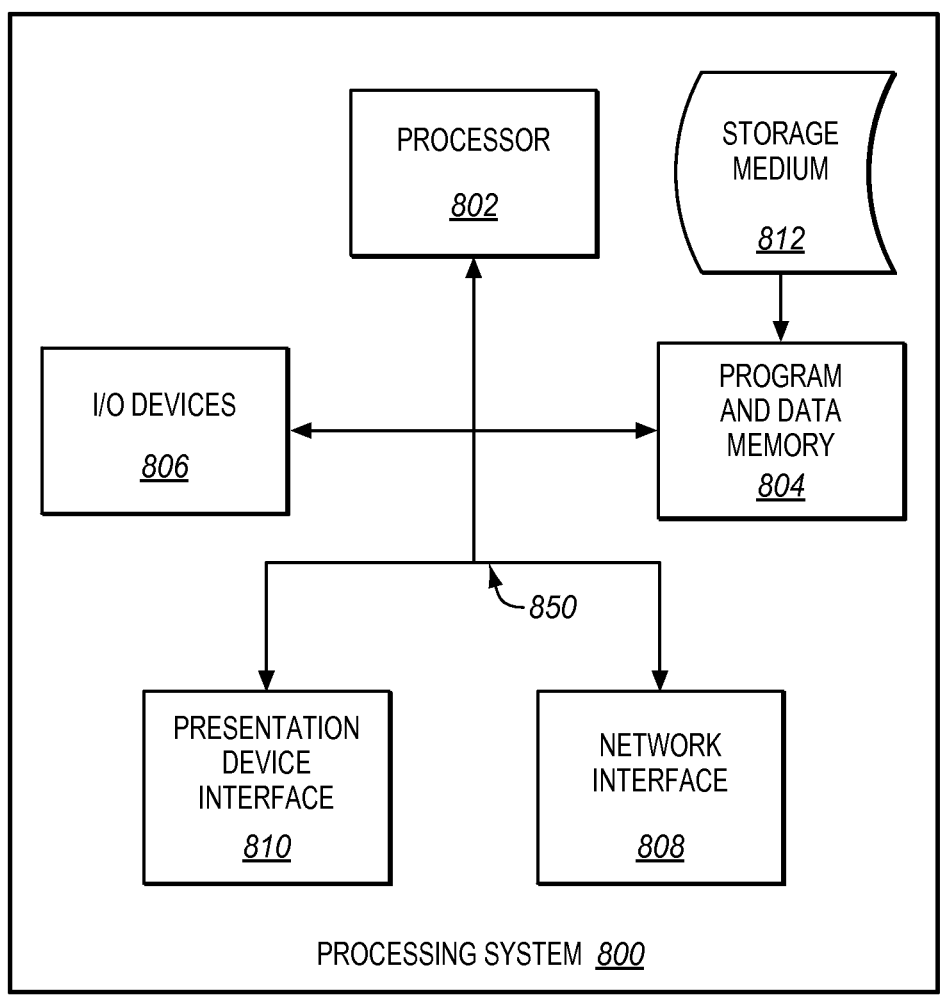
FIG. 8 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of tracking system 130 to perform the various operations disclosed herein. FIG. 8 illustrates a processing system 800 operable to execute a computer readable medium embodying programmed instructions to perform desired functions in an exemplary embodiment. Processing system 800 is operable to perform the above operations by executing programmed instructions tangibly embodied on computer readable storage medium 812. In this regard, embodiments of the invention can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be integrated with the system to interface to one or more presentation devices, such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A system comprising:
a memory that identifies categories of print jobs, and that stores rules that indicate how often print jobs will be received at a presentation system; and
a control unit operable to identify a rule for a category of print jobs, to analyze the rule to generate a predicted schedule of print jobs expected for receipt at the presentation system, to determine whether expected print jobs have been received at the presentation system in accordance with the schedule, and to generate an alert if an expected print job has not been received at the presentation system in accordance with the schedule, wherein the alert identifies print jobs in the predicted schedule that have not been received, and
the control unit is further operable to determine whether jobs received at the presentation system correspond with print jobs identified in the alert, and to add a received print job to a list of on-time received print jobs responsive to determining that the received job does not correspond with a print job identified in the alert.

2. The system of claim 1 wherein:
the control unit is further operable to generate the predicted schedule by identifying a look back period in the memory, determining an earlier time corresponding with the look back period, and analyzing the rule to add an entry to the predicted schedule for each expected print job between the earlier time and the present time.

3. The system of claim 1 wherein:
the control unit is further operable to determine whether jobs received at the presentation system correspond with print jobs identified in the alert, and to create a revised alert responsive to determining that a received job corresponds with a print job identified in the alert, wherein the revised alert does not include the received print job.

4. The system of claim 1 wherein:
the alert comprises a message indicating a time slot of an expected print job.

5. The system of claim 1 wherein:
the control unit is further operable to determine that a print job identified in the alert has not been received for more than a defined length of time, to conclude that the predicted schedule was in error regarding the identified print job, and to create a revised alert that does not include the identified print job, responsive to making the conclusion.

6. The system of claim 1 wherein:
the control unit is further operable to periodically generate predicted schedules for each of the categories stored in the memory.

7. The system of claim 1 wherein:
a category comprises a set of print jobs that include the same formatting and have been generated from the same template.

8. A method comprising:
accessing a memory of a presentation system, wherein the memory identifies categories of print jobs and stores rules that indicate how often print jobs will be received at the presentation system;
identifying a rule for a category of print jobs;

analyzing the rule with a processor of the presentation system to generate a predicted schedule of print jobs expected for receipt at the presentation system;

determining with the processor whether expected print jobs have been received at the presentation system in accordance with the schedule;

generating an alert if an expected print job has not been received at the presentation system, wherein the alert identifies print jobs in the predicted schedule that have not been received;

determining whether jobs received at the presentation system correspond with print jobs identified in the alert; and adding a received print job to a list of on-time received print jobs responsive to determining that the received job does not correspond with a print job identified in the alert.

9. The method of claim 8 wherein:

generating the predicted schedule comprises:
identifying a look back period in the memory;
determining an earlier time corresponding with the look back period; and
analyzing the rule to add an entry to the predicted schedule for each expected print job between the earlier time and the present time.

10. The method of claim 8 further comprising:

determining whether jobs received at the presentation system correspond with print jobs identified in the alert; and creating a revised alert responsive to determining that a received job corresponds with a print job identified in the alert, wherein the revised alert does not include the received print job.

11. The method of claim 8 wherein:

the alert comprises a message indicating a time slot of an expected print job.

12. The method of claim 8 further comprising:

determining that a print job in the alert has not been received for more than a defined length of time;

concluding that the predicted schedule was in error regarding the print job; and creating a revised alert that does not include the print job, responsive to making the conclusion.

13. The method of claim 8 further comprising:

periodically generating predicted schedules for each of the categories stored in the memory.

14. The method of claim 8 wherein:

a category comprises a set of print jobs that include the same formatting and have been generated from the same template.

15. A non-transitory computer readable medium embodying programmed instructions which, when executed by a processor, are operable for performing a method comprising:

accessing a memory of a presentation system, wherein the memory identifies categories of print jobs and stores rules that indicate how often print jobs will be received at the presentation system;

identifying a rule for a category of print jobs;

analyzing the rule with a processor of the presentation system to generate a predicted schedule of print jobs expected for receipt at the presentation system;

determining with the processor whether expected print jobs have been received at the presentation system in accordance with the schedule;

generating an alert if an expected print job has not been received at the presentation system, wherein the alert identifies print jobs in the predicted schedule that have not been received;

determining whether jobs received at the presentation system correspond with print jobs identified in the alert; and adding a received print job to a list of on-time received print jobs responsive to determining that the received job does not correspond with a print job identified in the alert.

16. The medium of claim 15 wherein:

generating the predicted schedule comprises:
identifying a look back period in the memory;
determining an earlier time corresponding with the look back period; and
analyzing the rule to add an entry to the predicted schedule for each expected print job between the earlier time and the present time.

17. The medium of claim 15 wherein the method further comprises:

determining whether jobs received at the presentation system correspond with print jobs identified in the alert; and creating a revised alert responsive to determining that a received job corresponds with a print job identified in the alert, wherein the revised alert does not include the received print job.

18. The medium of claim 15 wherein the method further comprises:

the alert comprises a message indicating a time slot of an expected print job.

19. The medium of claim 15 wherein the method further comprises:

determining that a print job in the alert has not been received for more than a defined length of time;

concluding that the predicted schedule was in error regarding the print job; and creating a revised alert that does not include the print job, responsive to making the conclusion.

20. The medium of claim 15 wherein the method further comprises:

periodically generating predicted schedules for each of the categories stored in the memory.

* * * * *